(12) United States Patent
Hawkins et al.

(10) Patent No.: US 7,883,564 B2
(45) Date of Patent: Feb. 8, 2011

(54) SYSTEMS AND METHODS FOR DISPOSING OF BRINE SOLUTIONS

(75) Inventors: Patrick Howard Hawkins, Blaine, MN (US); Ted Stern, Minneapolis, MN (US)

(73) Assignee: Hawkins, Inc., Minneapoolis, MN (US)

( * ) Notice: Subject to any disclaimer, the term of this patent is extended or adjusted under 35 U.S.C. 154(b) by 1158 days.

(21) Appl. No.: 11/183,166

(22) Filed: Jul. 15, 2005

(65) Prior Publication Data

US 2007/0012079 A1 Jan. 18, 2007

(51) Int. Cl.
*C05F 5/00* (2006.01)
(52) U.S. Cl. .................. 71/15; 71/22; 71/25; 71/32; 71/34; 71/64.1
(58) Field of Classification Search .......... 71/32, 71/64.1, 15, 22, 25, 34
See application file for complete search history.

(56) References Cited

U.S. PATENT DOCUMENTS

| 2,770,548 | A | * | 11/1956 | Hall et al. ................. 426/652 |
| 4,056,381 | A | * | 11/1977 | Kenton ...................... 71/36 |
| 4,318,729 | A | * | 3/1982 | Coury ........................ 71/29 |
| 4,336,053 | A | * | 6/1982 | Kenton ...................... 71/40 |
| 4,832,735 | A | * | 5/1989 | Crouse et al. .............. 71/36 |
| 5,578,107 | A | * | 11/1996 | Brill et al. ................. 71/34 |
| 5,865,870 | A | * | 2/1999 | Hsu .......................... 71/32 |
| 6,042,629 | A | * | 3/2000 | McGarrity ................. 71/25 |
| 6,054,155 | A | * | 4/2000 | Kobussen et al. .......... 426/92 |
| 6,153,234 | A | * | 11/2000 | Kobussen et al. .......... 426/92 |
| 6,460,290 | B1 | * | 10/2002 | Moore et al. ............. 47/48.5 |

FOREIGN PATENT DOCUMENTS

JP 4-74786 * 3/1992 ............... 71/64.1

* cited by examiner

*Primary Examiner*—Wayne Langel
(74) *Attorney, Agent, or Firm*—Pauly, DeVries Smith & Deffner, L.L.C.

(57) ABSTRACT

The invention relates to systems and methods for making fertilizer compositions out of potassium phosphate brine solutions recovered from meat processing operations. In an embodiment, the invention includes a method for making a fertilizer composition including filtering a meat-processing waste solution, and measuring the concentration of a salt in the meat-processing waste solution. In an embodiment, the invention includes a method for disposing of a meat-processing brine solution including filtering the meat-processing brine solution, and measuring the concentration of a salt in the meat-processing brine solution.

14 Claims, No Drawings

SYSTEMS AND METHODS FOR DISPOSING OF BRINE SOLUTIONS

FIELD OF THE INVENTION

The invention relates to systems and methods for disposing of brine solutions. More specifically, the invention relates to systems and methods for making fertilizer compositions out of potassium phosphate brine solutions recovered from meat processing operations.

BACKGROUND OF THE INVENTION

In some sausage-making processes, a sausage filling is co-extruded along with a collagen gel that forms the casing. After co-extrusion, the collagen gel is dehydrated and coagulated by application of a brine solution. The brine solution is typically collected after application and then reused in the manufacturing process. However, portions of the brine solution must be periodically discarded to make room for the addition of a fresh brine feed stock composition.

Potassium phosphate salts, by virtue of their high solubility, are often used in brine solutions. As a result, discarded brine solutions typically have a significant concentration of phosphate, in addition to trace amounts of other components picked up from contact with sausage casings such as protein, fats, carbohydrates, sugars, flavorings, browning agents, etc.

Accumulation of phosphate in bodies of water has been thought to contribute to negative environmental consequences such as algae blooms. Because of the significant concentration of phosphate in the discarded brine solution, it must be disposed of carefully to ensure a limited environmental impact.

Therefore, a need exists for methods and systems for disposing of potassium phosphate waste solutions recovered from meat processing operations.

SUMMARY OF THE INVENTION

The invention relates to systems and methods for making fertilizer compositions out of potassium phosphate brine solutions recovered from meat processing operations. In an embodiment, the invention includes a method for making a fertilizer composition including filtering a meat-processing waste solution, and measuring the concentration of salt in the meat-processing waste solution. In an embodiment, the invention includes a method for disposing of a meat-processing brine solution including filtering the meat-processing brine solution, and measuring the concentration of salt in the meat-processing brine solution.

The above summary of the present invention is not intended to describe each discussed embodiment of the present invention. This is the purpose of the detailed description that follows.

DETAILED DESCRIPTION OF THE INVENTION

In some modern sausage-making processes, brine solution used to treat sausage casings must be periodically discarded. The discarded brine solution typically has a significant concentration of potassium phosphate salts, in addition to other components picked up from contact with sausage casings such as protein, fats, carbohydrates, flavorings, etc. Because of the significant concentration of potassium phosphate salts in the discarded brine solution, it must be disposed of carefully to ensure a limited environmental impact.

Fertilizers are commonly used in agriculture to enhance the growth of crops. Potassium and phosphate are two key components of many different types of fertilizer compositions. Applicants have discovered methods and systems of disposing of discarded brine solution. Specifically, Applicants have discovered methods and systems of converting discarded brine solution recovered from meat processing operations into fertilizer compositions.

In an embodiment, the invention includes a method for making a fertilizer composition including filtering a meat-processing waste solution, and measuring the concentration of potassium phosphate salt in the meat-processing waste solution. In an embodiment, the invention includes a method for disposing of a meat-processing brine solution including filtering the meat-processing brine solution, measuring the concentration of potassium phosphate salt in the meat-processing brine solution, and adjusting the pH to between about 3 and about 11.

Discarded brine solutions useful with methods of the invention include those containing potassium phosphate salts. Potassium phosphate salts include monopotassium phosphate, dipotassium phosphate, tripotassium phosphate, tetrapotassium pyrophosphate, and potassium tripolyphosphate. The discarded brine solution can contain mixtures of different potassium phosphate salts. In a particular embodiment, discarded brine solutions used in methods of the invention contain dipotassium phosphate ($K_2HPO_4$).

Discarded brine solution may contain particulate matter. Particulate matter can cause fertilizer application equipment to malfunction. By way of example, particulate matter may clog up spray nozzles used to apply fertilizer compositions. In an embodiment, the discarded brine solution is filtered. It will be appreciated that many different types of filters and/or filtration techniques can be used. After filtration, by way of example, the fertilizer composition can be substantially free of particulate matter bigger than approximately 100 microns. In an embodiment, the fertilizer composition is substantially free or free of particulate matter bigger than approximately 30 microns. Filtering can be performed at any given point in the process of making fertilizer compositions. For example, filtering can be performed as a first step on the discarded brine solution. Alternately, filtering can be performed after other steps have been taken.

It will be appreciated that many different types of fertilizers having different specific nitrogen-phosphate-potassium contents can be made using discarded brine solution in accordance with methods of the invention. In an embodiment, the potassium and phosphate concentrations of the discarded brine solution are measured in order to calculate the quantities of other components that must be added to result in a fertilizer composition having desired nitrogen-phosphate-potassium contents. Potassium and phosphate concentrations can be measured in various ways. In an embodiment, the specific gravity of the discarded brine solution is measured and then the potassium and phosphate concentrations are calculated by referencing a standard curve or standard table (see e.g., Table 1 in Example 1 below).

By adding appropriate amounts of various components, the discarded brine solution can be formulated into a fertilizer having desired levels of nitrogen, phosphate, and potassium and a desired pH. For example, a nitrogen containing composition can be added. Nitrogen containing compositions can include urea, ammonia, ammonium hydroxide, ammonium nitrate, nitric acid, and the like.

As a further example, phosphate containing compositions can be added. Phosphate containing compositions can include phosphoric acid, monopotassium phosphate, dipotassium phosphate, tripotassium phosphate, tetrapotassium pyrophosphate, potassium tripolyphosphate, and the like.

Potassium containing compositions can also be added. Potassium containing compositions can include monopotassium phosphate, dipotassium phosphate, tripotassium phosphate, tetrapotassium pyrophosphate, and potassium tripolyphosphate, potassium hydroxide, and the like.

For nitrogen containing compositions, phosphate containing compositions, and/or potassium containing compositions, it will be appreciated that they can be added as dry compositions or as liquid compositions. Liquid compositions can be prepared and added at any desired strength (as limited by solubility). Relatively high strength liquid compositions or dry compositions can be used to increase the concentrations of potassium, phosphate, and/or nitrogen without increasing the total volume of the fertilizer composition as much as would occur with the use of lower strength liquid compositions. Therefore, the use of relatively high strength liquid compositions or dry compositions can be advantageous, particularly where the discarded brine solution to be converted into fertilizer has relatively low concentrations of potassium and phosphate to begin with. For example, a dipotassium phosphate solution having greater than 50 wt. % dipotassium phosphate (such as 60 wt. %) can be added in some embodiments. As a further example, dipotassium phosphate can be added as a dry composition.

In will be appreciated that the pH of the composition can be adjusted using various components such as phosphoric acid, nitric acid, potassium hydroxide, ammonium hydroxide, and the like. In an embodiment, the pH of the composition is adjusted to between about 3 and about 11. In a particular embodiment, the pH of the composition is adjusted to between about 5 and 8.

Other components can also be added to the fertilizer compositions beyond those impacting nitrogen, phosphate, and potassium content. For example, components can be added such as calcium, magnesium, sulfur, iron, copper, zinc, and the like.

Fertilizer Compositions

Methods of the invention can be used to create fertilizer compositions. In an embodiment, the fertilizer composition is a liquid. In an embodiment, the fertilizer composition is a solid. As used herein, the term "fertilizer" shall refer to a composition that enhances the fertility of soil formulated to have a defined content of total nitrogen, available phosphate, and soluble potassium oxide.

Fertilizers are frequently designated by a three number system such as "12-18-18" wherein the first number refers to the weight percent of total nitrogen (nitrates, urea, ammonia), the second number refers to the weight percent of available phosphate ($P_2O_5$), and the third number refers to the weight percent of soluble potassium oxide ($K_2O$, "potash").

As used herein, the term "total nitrogen" refers to nitrogen content including nitrate nitrogen, ammoniacal nitrogen, water-soluble organic nitrogen and/or urea nitrogen, and water-insoluble nitrogen.

As used herein, the term "available phosphate" refers to the water-soluble plus the citrate-soluble phosphorus as phosphate or phosphoric acid.

As used herein, the term "soluble potassium oxide" refers to that portion of the potassium oxide contained in fertilizer or fertilizer materials that is soluble in aqueous ammonium oxalate, aqueous ammonium citrate, or water.

Embodiments of the invention can be used to produce various fertilizer compositions. By way of example, fertilizer compositions of the invention can include from about 0 to about 50 weight percent total nitrogen. In an embodiment, the fertilizer composition includes from about 0 to about 10 weight percent total nitrogen. Fertilizer compositions of the invention can include from about 1 to about 50 weight percent available phosphate. In an embodiment, the fertilizer composition includes from about 1 to about 30 weight percent available phosphate. Fertilizer compositions of the invention can include from about 1 to about 50 weight percent soluble potassium oxide. In an embodiment, the fertilizer composition includes from about 1 to about 30 weight percent soluble potassium oxide. In a particular embodiment, the fertilizer composition of the invention includes about 3 wt. % total nitrogen, about 18 wt. % available phosphate, and about 18 wt. % soluble potassium oxide ("3-18-18 fertilizer").

The present invention may be better understood with reference to the following example. This example is intended to be representative of a specific embodiment of the invention, and is not intended as limiting the scope of the invention.

EXAMPLES

Example 1

Production of 3-18-18 Fertilizer

The specific gravity of a batch of recovered brine solution is measured. The concentration (wt. %) of dipotassium phosphate ("DKP") in the recovered brine solution is then calculated by reference to a standard curve or table such as that shown in Table 1 below:

TABLE 1

| Spec. Grav. | wt. % DKP | wt. % $P_2O_5$ | wt. % $K_2O$ |
|---|---|---|---|
| 1.185 | 20.0 | 7.90 | 10.53 |
| 1.190 | 20.5 | 8.10 | 10.80 |
| 1.195 | 21.0 | 8.30 | 11.06 |
| 1.200 | 21.5 | 8.50 | 11.32 |
| 1.205 | 22.0 | 8.69 | 11.59 |
| 1.210 | 22.5 | 8.89 | 11.85 |
| 1.216 | 23.0 | 9.09 | 12.11 |
| 1.221 | 23.5 | 9.29 | 12.38 |
| 1.226 | 24.0 | 9.48 | 12.64 |
| 1.231 | 24.5 | 9.68 | 12.90 |
| 1.236 | 25.0 | 9.88 | 13.17 |
| 1.241 | 25.5 | 10.08 | 13.43 |
| 1.247 | 26.0 | 10.28 | 13.69 |
| 1.252 | 26.5 | 10.47 | 13.95 |
| 1.258 | 27.0 | 10.67 | 14.22 |
| 1.263 | 27.5 | 10.87 | 14.48 |
| 1.268 | 28.0 | 11.07 | 14.74 |
| 1.275 | 28.5 | 11.26 | 15.01 |
| 1.280 | 29.0 | 11.46 | 15.27 |
| 1.285 | 29.5 | 11.66 | 15.53 |
| 1.291 | 30.0 | 11.86 | 15.80 |
| 1.297 | 30.5 | 12.05 | 16.06 |
| 1.302 | 31.0 | 12.25 | 16.32 |
| 1.308 | 31.5 | 12.45 | 16.59 |
| 1.313 | 32.0 | 12.65 | 16.85 |
| 1.319 | 32.5 | 12.84 | 17.11 |
| 1.325 | 33.0 | 13.04 | 17.38 |
| 1.331 | 33.5 | 13.24 | 17.64 |
| 1.336 | 34.0 | 13.44 | 17.90 |
| 1.342 | 34.5 | 13.63 | 18.17 |
| 1.348 | 35.0 | 13.83 | 18.43 |
| 1.354 | 35.5 | 14.03 | 18.69 |
| 1.359 | 36.0 | 14.23 | 18.96 |
| 1.364 | 36.5 | 14.42 | 19.22 |
| 1.370 | 37.0 | 14.62 | 19.48 |
| 1.376 | 37.5 | 14.82 | 19.75 |
| 1.382 | 38.0 | 15.02 | 20.01 |
| 1.388 | 38.5 | 15.22 | 20.27 |
| 1.395 | 39.0 | 15.41 | 20.54 |

TABLE 1-continued

| Spec. Grav. | wt. % DKP | wt. % P$_2$O$_5$ | wt. % K$_2$O |
|---|---|---|---|
| 1.401 | 39.5 | 15.61 | 20.80 |
| 1.407 | 40.0 | 15.81 | 21.06 |
| 1.413 | 40.5 | 16.01 | 21.33 |
| 1.419 | 41.0 | 16.20 | 21.59 |
| 1.425 | 41.5 | 16.40 | 21.85 |
| 1.431 | 42.0 | 16.60 | 22.12 |
| 1.437 | 42.5 | 16.80 | 22.38 |

The recovered brine solution is filtered with a 30 micron filter and then poured into a mixing tank. The recovered brine solution is then mixed for a period of time and the specific gravity is measured again.

An amount of dipotassium phosphate solution (60 wt. %) is then added to the mixing tank. The amount of dipotassium phosphate added is sufficient to raise the soluble potassium oxide in the finished fertilizer to about 18 wt. %. An amount of phosphoric acid (75 wt. %) is added to the mixing tank. The total amount of dipotassium phosphate and phosphoric acid added is sufficient to raise the available phosphate in the finished fertilizer to about 18 wt. %. An amount of urea (50 wt. %) is added to the mixing tank. An amount of ammonium hydroxide (26° Baume or about 29.4 wt. %) is added to the mixing tank. The total amount of urea and ammonium hydroxide added is sufficient to raise the total nitrogen in the finished fertilizer to about 3 wt. %. The contents of the mixing tank are mixed while each component is added.

After the components are thoroughly mixed together, the specific gravity of the combined solution is measured. If the specific gravity is above 1.398, water is added to lower the specific gravity.

A 40 ml sample of the combined solution is then added to a 40 ml volume of water to create a 50/50 dilution. The pH of the 50/50 dilution is then measured. If the pH is above 7.4, then phosphoric acid is added to the combined solution to lower the pH. If the pH is less than 7.1, then aqua ammonia (ammonium hydroxide) is added to the combined solution to increase the pH. The combined solution is then pumped out of the mixing tank to yield a finished batch of 3-18-18 fertilizer.

Further Embodiments

In an embodiment, the invention includes a method for making a fertilizer composition including filtering a meat-processing waste solution and measuring the concentration of a salt in the meat-processing waste solution. The method can include adjusting the pH to between about 3 and about 11. The meat-processing waste solution can be a brine solution. The meat-processing waste solution can include a potassium phosphate salt. The meat-processing waste solution can include dipotassium phosphate. In the method, measuring the concentration of a salt can include measuring the concentration of dipotassium phosphate. The method can also include adding a phosphate containing composition. The phosphate containing composition can include dipotassium phosphate. The phosphate containing composition can include phosphoric acid. The method can also include adding a potassium containing composition. The potassium containing composition can include potassium hydroxide. The method can also include adding a nitrogen containing composition. The nitrogen containing composition can include urea. The nitrogen containing composition can include ammonia. The nitrogen containing composition can include ammonium nitrate. The nitrogen containing composition can include nitric acid. The meat-processing waste solution can include organic wastes. The meat-processing waste solution can include trace amounts of one or more of proteins, fats, oils, sugars, flavorings, or coloring agents. The fertilizer composition can include from about 0 to about 10 wt. % total nitrogen, from about 1 to about 30 wt. % available phosphate, and from about 1 to about 30 wt. % soluble potassium. The fertilizer composition can include about 3 wt. % total nitrogen, about 18 wt. % available phosphate, and about 18 wt. % soluble potassium.

In an embodiment, the invention includes a method for disposing of a meat-processing brine solution including filtering the meat-processing brine solution and measuring the concentration of a salt in the meat-processing brine solution. The method can include adjusting the pH to between about 3 and about 11. The meat-processing brine solution can include a potassium phosphate salt. The meat-processing brine solution can include dipotassium phosphate. In the method, measuring the concentration of a salt can include measuring the concentration of dipotassium phosphate. The method can include adding dipotassium phosphate. The method can include adding phosphoric acid. The method can include adding potassium hydroxide. The method can include adding a nitrogen containing composition. The nitrogen containing composition can include urea. The nitrogen containing composition can include ammonia. The nitrogen containing composition can include ammonium nitrate. The nitrogen containing composition can include nitric acid. The meat-processing brine solution can include organic wastes. The meat-processing brine solution can include trace amounts of one or more of proteins, fats, oils, sugars, flavorings, or coloring agents.

In an embodiment, the invention can include a method for making a fertilizer composition including measuring the concentration of a salt in a discarded meat-processing brine solution; and adjusting the pH of the discarded meat-processing brine solution to between about 3 and about 11. In an embodiment, the invention includes a method for disposing of a meat-processing brine solution including measuring the concentration of a salt in the meat-processing brine solution and adjusting the pH of the discarded meat-processing brine solution to between about 3 and about 11.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

While the present invention has been described with reference to several particular implementations, those skilled in the art will recognize that many changes may be made hereto without departing from the spirit and scope of the present invention.

We claim:

1. A method for making a fertilizer composition comprising:
   filtering a meat-processing waste solution, and
   measuring the concentration of a salt in the meat-processing waste solution.

2. The method of claim 1, further comprising adjusting the pH of the solution to between about 3 and about 11.

3. The method of claim 1, wherein the meat-processing waste solution comprises a potassium phosphate salt.

4. The method of claim 1, wherein the meat-processing waste solution comprises dipotassium phosphate.

5. The method of claim 1, further comprising adding a phosphate containing composition to the solution.

6. The method of claim 1, wherein the phosphate containing composition comprises dipotassium phosphate.

7. The method of claim 1, wherein the phosphate containing composition comprises phosphoric acid.

8. The method of claim 1, further comprising adding a potassium containing composition to the solution.

9. The method of claim 8, wherein the potassium containing composition comprises potassium hydroxide.

10. The method of claim 1, further comprising adding a nitrogen containing composition to the solution, the nitrogen containing composition comprising one or more of urea, ammonia, ammonium nitrate, or nitric acid.

11. The method of claim 1, wherein the meat-processing waste solution comprises trace amounts of one or more of proteins, fats, oils, sugars, flavorings, or coloring agents.

12. The method of claim 1, wherein the fertilizer composition comprises from about 0 to about 10 wt. % total nitrogen, from about 1 to about 30 wt. % available phosphate, and from about 1 to about 30 wt. % soluble potassium.

13. The method of claim 1, wherein the fertilizer composition comprises about 3 wt. % total nitrogen, about 18 wt. % available phosphate, and about 18 wt. % soluble potassium.

14. A method for making a fertilizer composition comprising:

measuring the concentration of a salt in a discarded meat-processing brine solution; and adjusting the pH of the discarded meat-processing brine solution to between about 3 and about 11.

* * * * *